(12) United States Patent
Stephan et al.

(10) Patent No.: US 10,601,362 B2
(45) Date of Patent: Mar. 24, 2020

(54) TILE REPLACEMENT SOLAR MOUNTING SYSTEM

(71) Applicant: PEGASUS SOLAR INC., Richmond, CA (US)

(72) Inventors: Erich Kai Stephan, Newport Beach, CA (US); Glenn Harris, Sausalito, CA (US)

(73) Assignee: PEGASUS SOLAR INC., Richmond, CA (US)

( * ) Notice: Subject to any disclaimer, the term of this patent is extended or adjusted under 35 U.S.C. 154(b) by 0 days.

(21) Appl. No.: 15/698,521

(22) Filed: Sep. 7, 2017

(65) Prior Publication Data

US 2018/0076756 A1    Mar. 15, 2018

Related U.S. Application Data

(60) Provisional application No. 62/385,779, filed on Sep. 9, 2016.

(51) Int. Cl.

| | |
|---|---|
| *H02S 20/25* | (2014.01) |
| *H02S 30/10* | (2014.01) |
| *F16B 5/02* | (2006.01) |
| *H02S 40/00* | (2014.01) |
| *H02S 20/23* | (2014.01) |
| *H02S 30/00* | (2014.01) |
| *F16B 21/02* | (2006.01) |

(52) U.S. Cl.
CPC ............ *H02S 20/25* (2014.12); *F16B 5/0225* (2013.01); *H02S 20/23* (2014.12); *H02S 30/00* (2013.01); *H02S 30/10* (2014.12); *H02S 40/00* (2013.01); *F16B 21/02* (2013.01); *Y02B 10/12* (2013.01); *Y02E 10/50* (2013.01)

(58) Field of Classification Search
CPC ......... H02S 20/25; H02S 30/10; F16B 5/0225
USPC .............. 52/173.3; 248/223.41, 225.11, 237, 248/297.21
See application file for complete search history.

(56) References Cited

U.S. PATENT DOCUMENTS

| | | | | |
|---|---|---|---|---|
| 3,332,186 | A | * | 7/1967 | Cammaert ................ E04D 3/36 52/302.1 |
| 4,213,282 | A | * | 7/1980 | Heckelsberg ........... E04D 3/362 52/404.2 |
| 4,445,656 | A | * | 5/1984 | Leitch ................... F16L 3/1058 24/23 R |
| 4,522,005 | A | * | 6/1985 | Seaburg .................. E04D 3/362 52/520 |

(Continued)

OTHER PUBLICATIONS

"Tile Replace for Rails," Pegasus Solar Inc., available at http://pegasussolar.com/tile-replace-rails/ Apr. 2017, 11 pages.

(Continued)

*Primary Examiner* — Patrick J Maestri
*Assistant Examiner* — Joseph J. Sadlon
(74) *Attorney, Agent, or Firm* — Polsinelli

(57) ABSTRACT

A solar panel mounting system for use on flat and "S" tile roof structures includes a support arm coupled to a threaded post. A base flashing and corresponding attachment bracket are configured to couple with the post. A tile replacement flashing is installed over the base flashing and includes a conical protrusion with associated aperture. The aperture is configured to receive the post.

18 Claims, 14 Drawing Sheets

(56) References Cited

U.S. PATENT DOCUMENTS

| | | | | |
|---|---|---|---|---|
| 4,788,801 | A * | 12/1988 | Jones | E04D 1/3405 |
| | | | | 52/199 |
| 5,121,583 | A * | 6/1992 | Hirai | F24S 25/61 |
| | | | | 52/90.1 |
| 5,600,971 | A * | 2/1997 | Suk | E04D 3/3608 |
| | | | | 52/470 |
| 5,603,187 | A * | 2/1997 | Merrin | E04D 13/12 |
| | | | | 248/237 |
| 5,743,063 | A * | 4/1998 | Boozer | E04B 7/00 |
| | | | | 52/508 |
| 5,746,029 | A * | 5/1998 | Ullman | E04D 13/12 |
| | | | | 248/237 |
| 5,937,603 | A * | 8/1999 | Zeidler | A62C 3/02 |
| | | | | 52/408 |
| 6,786,012 | B2 * | 9/2004 | Bradley, Jr. | F24J 2/5247 |
| | | | | 136/244 |
| 7,070,374 | B2 * | 7/2006 | Womack | B60P 7/0815 |
| | | | | 410/104 |
| D608,475 | S | 1/2010 | Troy | |
| D608,916 | S | 1/2010 | Troy | |
| 7,752,845 | B2 * | 7/2010 | Johnson | B01J 15/005 |
| | | | | 60/645 |
| 7,861,485 | B1 * | 1/2011 | Wentworth | E04D 1/30 |
| | | | | 52/745.06 |
| 7,921,607 | B2 * | 4/2011 | Thompson | F24S 25/61 |
| | | | | 52/60 |
| 8,087,206 | B1 | 1/2012 | Worley et al. | |
| 8,424,255 | B2 * | 4/2013 | Lenox | F24J 2/5245 |
| | | | | 52/173.3 |
| 8,464,478 | B2 * | 6/2013 | Tweedie | F24S 25/67 |
| | | | | 52/173.3 |
| 8,539,719 | B2 * | 9/2013 | McPheeters | E04D 13/1476 |
| | | | | 52/27 |
| 8,549,793 | B1 | 10/2013 | Gens et al. | |
| 8,631,629 | B1 * | 1/2014 | Wiener | F16B 5/0275 |
| | | | | 126/623 |
| 8,647,009 | B2 * | 2/2014 | Kobayashi | F24S 25/61 |
| | | | | 403/7 |
| 8,752,338 | B2 * | 6/2014 | Schaefer | E04B 1/38 |
| | | | | 52/60 |
| 8,756,881 | B2 * | 6/2014 | West | E04B 1/38 |
| | | | | 52/173.3 |
| 8,776,456 | B1 * | 7/2014 | Schrock | H02S 20/00 |
| | | | | 52/173.3 |
| 8,869,490 | B2 * | 10/2014 | Schaefer | A47B 96/14 |
| | | | | 52/710 |
| 8,929,094 | B2 * | 1/2015 | Marroquin | H05K 7/10 |
| | | | | 361/807 |
| 8,935,893 | B2 | 1/2015 | Liu et al. | |
| 8,938,932 | B1 | 1/2015 | Wentworth et al. | |
| 8,991,114 | B2 * | 3/2015 | West | H02S 20/30 |
| | | | | 52/173.3 |
| 9,010,043 | B2 * | 4/2015 | Kanczuzewski | F16M 13/02 |
| | | | | 52/173.3 |
| 9,068,339 | B2 * | 6/2015 | Schaefer | A47B 96/14 |
| 9,121,545 | B2 * | 9/2015 | Stanley | F16M 13/022 |
| 9,134,044 | B2 * | 9/2015 | Stearns | E04D 3/36 |
| 9,163,859 | B2 * | 10/2015 | Prentice | H01L 31/18 |
| 9,169,648 | B1 | 10/2015 | Mills | |
| 9,300,244 | B2 * | 3/2016 | West | F24S 25/67 |
| 9,523,517 | B2 * | 12/2016 | Warpup | H02S 20/10 |
| 9,556,893 | B2 * | 1/2017 | Dent | E04B 1/38 |
| 9,624,669 | B2 | 4/2017 | Torres et al. | |
| 9,652,985 | B2 * | 5/2017 | Myer | G08G 1/096783 |
| 9,722,532 | B2 * | 8/2017 | Almy | F24J 2/5258 |
| 9,755,571 | B2 * | 9/2017 | Almy | H02S 20/23 |
| 9,806,668 | B2 * | 10/2017 | Johansen | H02S 20/23 |
| 9,828,773 | B2 * | 11/2017 | Imai | E04B 1/38 |
| 9,874,021 | B2 * | 1/2018 | Hudson | F24S 21/00 |
| 9,876,462 | B2 * | 1/2018 | Hudson | H02S 20/23 |
| 9,876,463 | B2 * | 1/2018 | Jasmin | H02S 20/23 |
| 9,906,187 | B2 * | 2/2018 | Taylor | H02S 20/22 |
| 9,923,511 | B2 * | 3/2018 | Xie | H02S 30/10 |
| 9,935,356 | B2 * | 4/2018 | Wentworth | E04D 13/1476 |
| D827,160 | S | 8/2018 | Menton | |
| D827,873 | S | 9/2018 | Menton | |
| 10,087,965 | B2 * | 10/2018 | Kim | F16B 5/0233 |
| 10,090,800 | B2 * | 10/2018 | McPheeters | H02S 20/30 |
| 10,103,683 | B2 * | 10/2018 | Wentworth | H02S 20/23 |
| 10,138,634 | B2 * | 11/2018 | Erekson | E04D 13/1476 |
| 10,256,767 | B1 * | 4/2019 | Sinai | H02S 30/10 |
| 10,312,853 | B2 * | 6/2019 | MacRostie | H02S 20/23 |
| 10,389,294 | B2 * | 8/2019 | Au | H02S 20/32 |
| 10,396,706 | B2 * | 8/2019 | Powers, III | F24S 25/636 |
| 10,461,682 | B2 * | 10/2019 | Schuit | F24S 25/632 |
| 2010/0170163 | A1 | 7/2010 | Tarbell et al. | |
| 2010/0192505 | A1 | 8/2010 | Schaefer et al. | |
| 2012/0031019 | A1 | 2/2012 | Stearns et al. | |
| 2012/0144760 | A1 * | 6/2012 | Schaefer | E04C 3/06 |
| | | | | 52/58 |
| 2014/0331594 | A1 * | 11/2014 | Stearns | H01Q 1/207 |
| | | | | 52/705 |
| 2015/0034355 | A1 | 2/2015 | Patton et al. | |
| 2015/0129517 | A1 | 5/2015 | Wildes | |
| 2015/0155823 | A1 * | 6/2015 | West | F24S 25/65 |
| | | | | 248/346.04 |
| 2015/0288320 | A1 | 10/2015 | Stearns et al. | |
| 2016/0087576 | A1 | 3/2016 | Johansen et al. | |
| 2017/0102167 | A1 | 4/2017 | Stephan et al. | |
| 2018/0062560 | A1 | 3/2018 | Stephan et al. | |
| 2018/0106289 | A1 | 4/2018 | Ash et al. | |
| 2018/0115274 | A1 | 4/2018 | Stephan et al. | |
| 2018/0238589 | A1 | 8/2018 | Ash et al. | |

OTHER PUBLICATIONS

"Pegasus Solar Tile Replace Mounting Systems," Pegasus Solar Inc., available at http://pegasussolar.com/residential-tile-roofs/ Sep. 2016, 7 pages.

* cited by examiner

TILE REPLACEMENT SOLAR MOUNTING SYSTEM

CROSS-REFERENCE TO RELATED APPLICATION

This application claims the benefit of U.S. Provisional Patent Application No. 62/385,779, filed on Sep. 9, 2016, the content of which is incorporated by this reference.

BACKGROUND

Solar energy panels are becoming increasingly popular. However, current solar panel mounting solutions are overly complicated, not reliable, and otherwise inadequate. For example, current solar panel mounting solutions involve complicated systems for coupling a mounting system to a tile roof.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Figure 1:
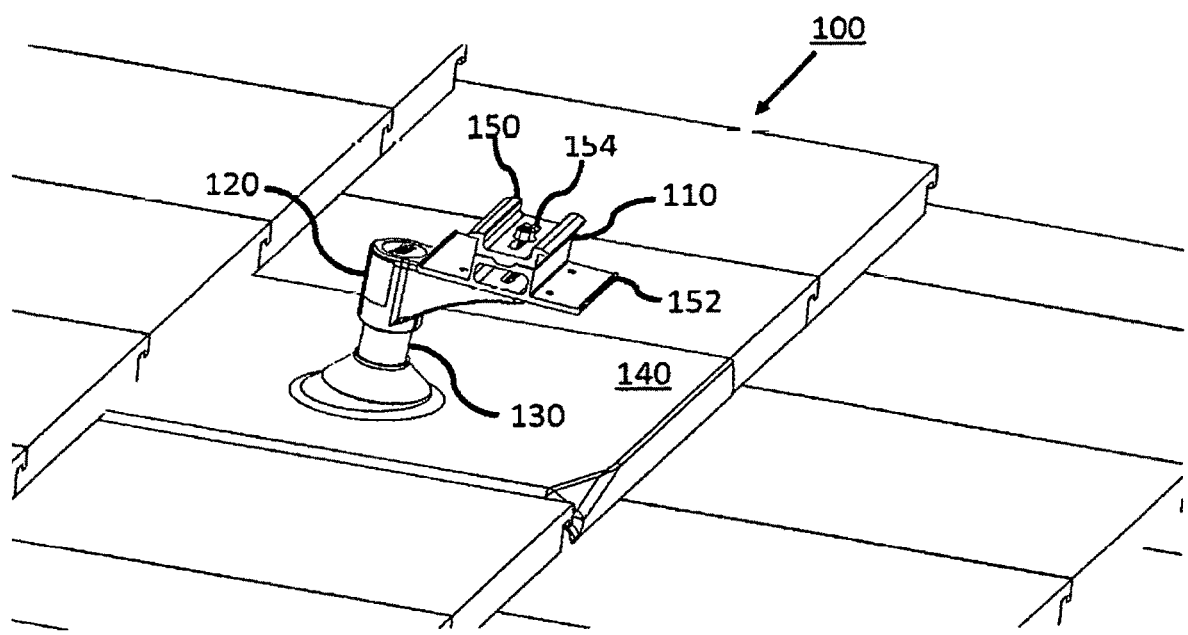
FIG. 1 illustrates a tile replacement solar panel frame mounting system.

FIG. 1 illustrates a tile replacement solar panel frame mounting system 100 including a mounting clamp assembly 110 coupled to a support arm assembly 120 that is thread on to a post 130 secured to an installation surface through a tile replacement flashing 140. Mounting clamp assembly 110 includes a top clamp 150, a bottom clamp 152, and a fastener 154 that is inserted through the top clamp 150 and the bottom clamp 152, and fastened with a fastener nut. Some embodiments of the present technology involve a base flashing and an attachment bracket that can be used to secure the post 130 to the installation surface.

Figure 2A:
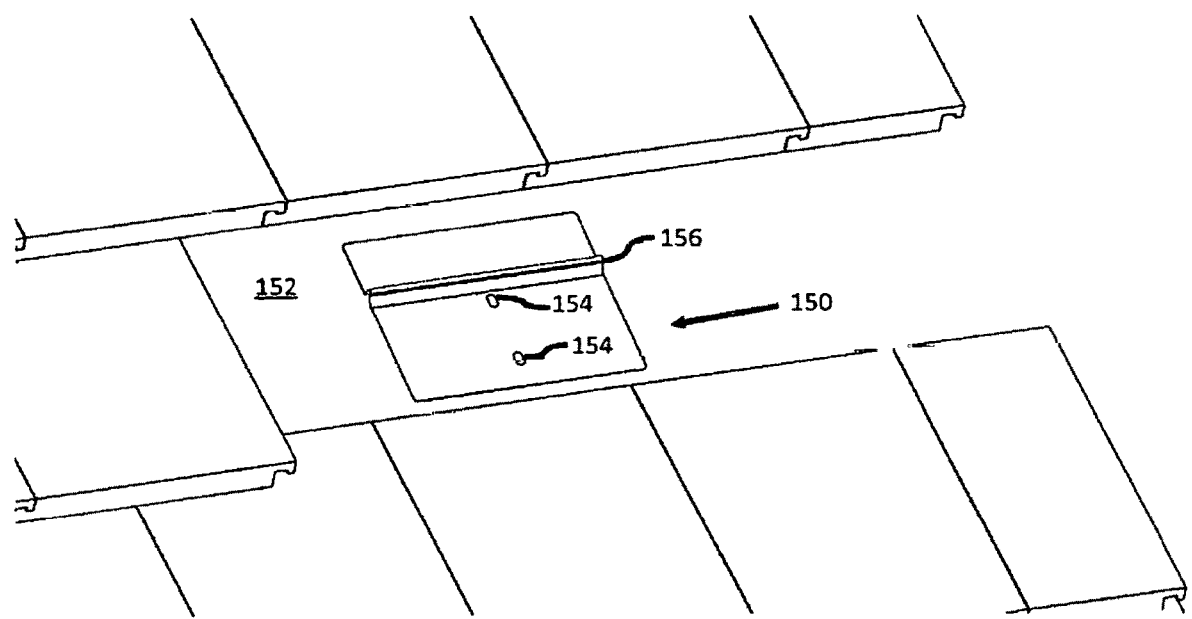
FIG. 2A illustrates a base flashing for the tile replacement solar panel frame mounting system.

FIG. 2A illustrates a base flashing 150 that can be used in the tile replacement solar panel frame mounting system 100. The base flashing 150 can be installed on an installation surface 152 and can be configured to act as a barrier to water reaching holes in installation surface created through installing the tile replacement solar panel frame mounting system 100. In some cases, the installation surface 152 can be covered with a moisture barrier, vapor barrier, etc. and a portion of the base flashing 150 can slide under the barrier.

The base flashing 150 can include through-holes 154 for allowing fasteners to traverse the base flashing 150 and to be fastened to the installation surface. Also, the through-holes 154 can be sized to allow the base flashing a degree of movement about a fastener until the fastener is tightly secured to the installation surface 152.

Figure 2B:
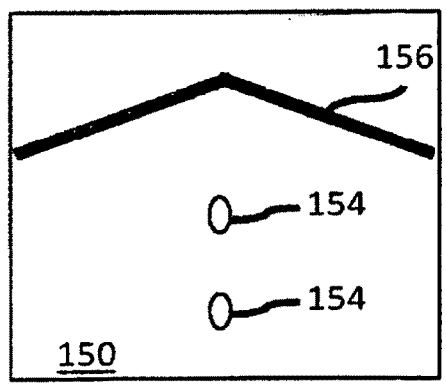
FIG. 2B illustrates a top view of a base flashing with a chevron-shaped ridge feature.
Figure 2C:
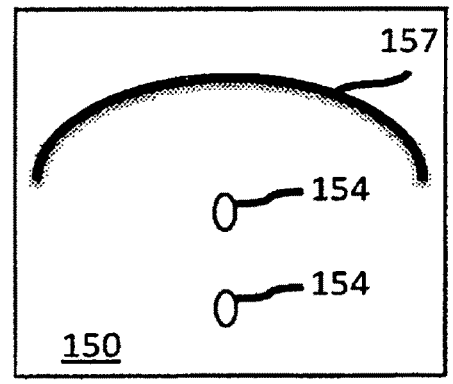
FIG. 2C illustrates a top view of a base flashing with a curved ridge feature.

The base flashing 150 can include a ridge feature 156 that extends across the base flashing 150. The ridge feature 156 can be used to inhibit water from flowing into the region of the base flashing 150 containing the through-holes 154. For example, when an installation surface is sloped, the base flashing 150 can be positioned with the ridge feature 156 up-slope from the through-holes 154. In this configuration, water flowing down-slope on the installation surface is inhibited by the ridge feature 156 and prevented from reaching the through-holes 154. In some cases, the surfaces of the ridge feature 156 are configured at angles that allow the base flashing 150 to stack on a like base flashing 150. Also, in some cases, the ridge feature 156 has a geometry that prevents water from pooling along its surface. For example, FIG. 2B illustrates a top view of a base flashing 150 with a chevron-shaped ridge feature 156 and FIG. 2C illustrates a top view of a base flashing 150 with a curved ridge feature 157.

Figure 3A:
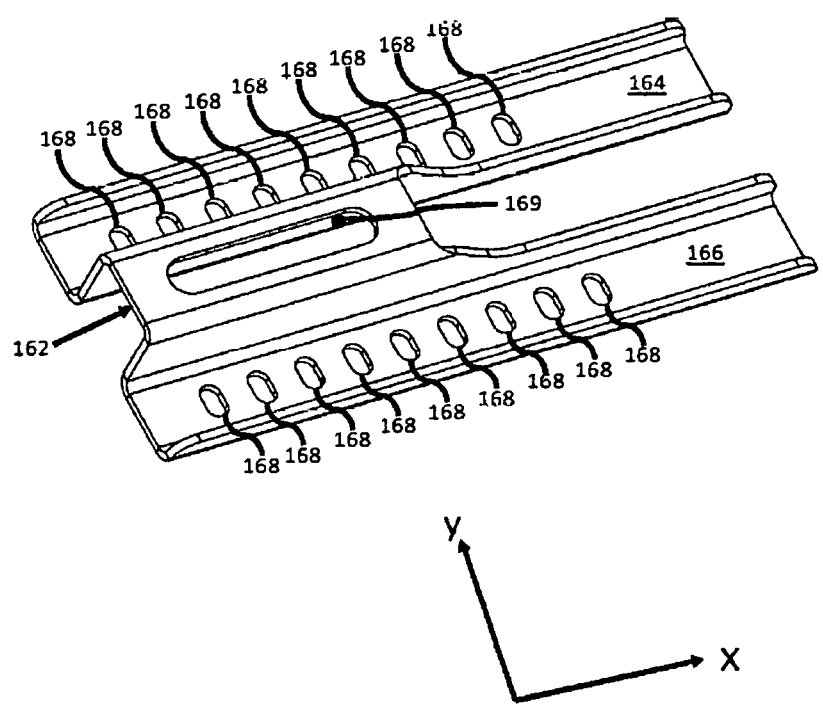
FIG. 3A illustrates an attachment bracket for the tile replacement solar panel frame mounting system.

The tile replacement solar panel frame mounting system 100 can also include an attachment bracket that supports the post 130. FIG. 3A illustrates an attachment bracket 160. The attachment bracket 160 includes a raised center section 162 and two flat sections 164, 166 that interface with the base flashing 150 or directly with an installation surface. In some cases, the flat sections 164, 166 include a plurality of attachment slots 168 along the length of the attachment bracket 160. The attachment slots are configured to receive a fastener for coupling the attachment bracket 160 to the installation surface.

The attachment bracket 160 also includes a post slot 169 in the raised center section 162. The post slot 169 can be configured to accept a coupling feature of a post, e.g. a T-bolt, cam fastener, etc. (explained in greater detail below). The post slot 169 can have an extended length (i.e. along the x-axis) to allow the post to be coupled in a variety of positions within the post slot 169. Also, the multiple attachment slots 168 allow the attachment bracket 160 to be fastened in a variety of positions relative to a roof joist, stud, etc. Additionally, the raised center section 162 can be truncated to occupy only a portion of the length (i.e. along the x-axis) of the attachment bracket 160—leaving a gap 163 or a flat center portion (not shown). The gap 163 or flat center portion defined by the truncated raised center section 162 can accommodate the attachment bracket 160 being partially positioned under an adjacent tile.

The multiple attachment slots 168 can also extend along a width (i.e. the y-axis) of the flat sections 164, 166 to allow the attachment bracket 160 to be adjusted up and down on an installation surface. The attachment slots 168 can be sized to allow the attachment bracket 160 a degree of movement about one or more fasteners until the fastener(s) is tightly secured to the installation surface 152. Furthermore, the extended post slot 169 and the multiple attachment slots 168 allow the attachment bracket to be fastened to a roof joist, etc., in a variety of positions while the post 130 remains in the same position relative to the installation surface and tiles. Moreover, the adjustability provided by the extended post slot 169, the multiple attachment slots 168, the extended width of the attachment slots 168, and the truncated raised center section 162 provide synergistic adjustment effects in both the x-axis and y-axis directions. The extended post slot 169 may provide additional x-axis flexibility to position the post 130 after the attachment bracket 160 has already been secured to installation surface 152. In some cases, the attachment bracket 160 can be formed of a single piece of sheet metal. Also, the attachment bracket 160 can be formed without having any orthogonal features, thereby allowing multiple attachment brackets to be stackable with one another.

Figure 3B:
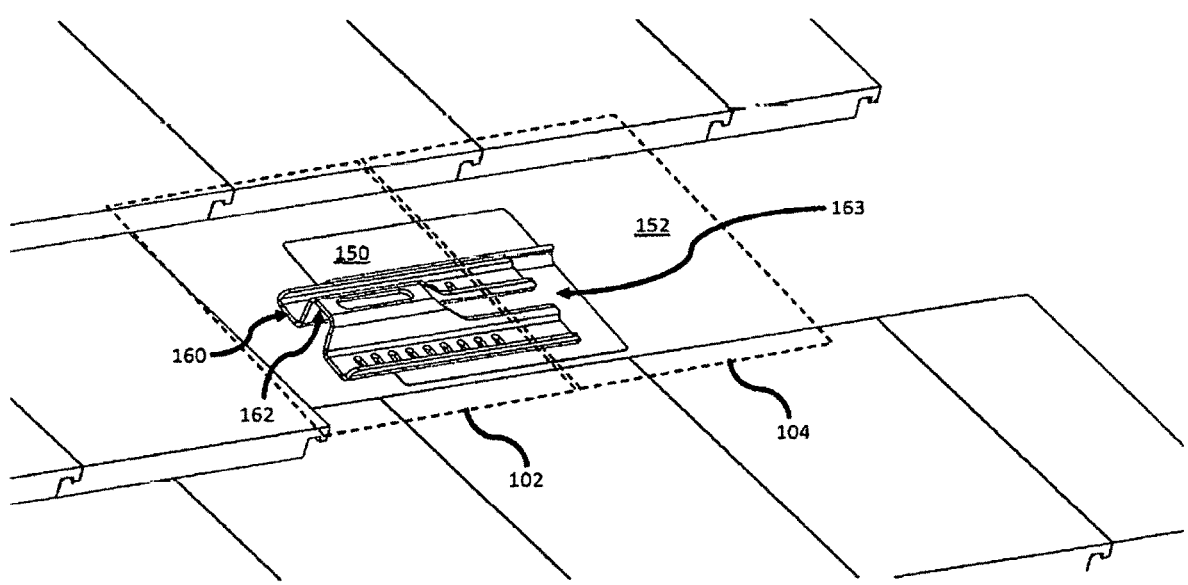
FIG. 3B illustrates an attachment bracket fastened to an installation surface over a base flashing.

FIG. 3B illustrates an attachment bracket 160 fastened to an installation surface 152 over a base flashing 150. The installation surface 152 is exposed after removing two tiles 102, 104 (illustrated using dashed lines). As shown, the gap 163 or flat center portion defined by the truncated raised center section 162 allows the attachment bracket 160 to fit under tile 104. Therefore, installation of the attachment bracket 160 can be achieved by removing only tile 102, and attachment bracket 160 can be fastened to a structural rafter under roof tile 104 without interference with roof tile 104. After the attachment bracket 160 is fastened to the installation surface 152, a tile replacement flashing 140 can be coupled with adjacent tiles, and may take the place of roof tile 102.

Figure 4A:
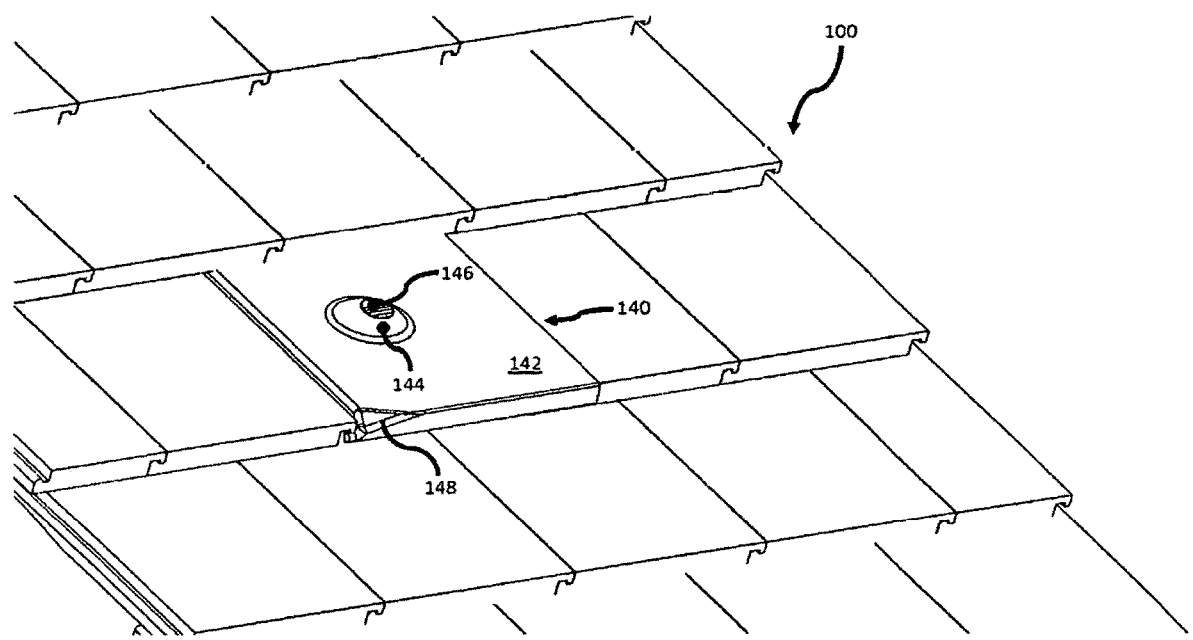
FIG. 4A illustrates the tile replacement solar panel frame mounting system with a tile replacement flashing installed over the base flashing and the attachment bracket.

FIG. 4A illustrates the tile replacement solar panel frame mounting system 100 with a tile replacement flashing 140 installed over the base flashing 150 and the attachment bracket 160. In the some embodiments, the tile replacement flashing 140 includes a substantially planar surface 142 and a conical protrusion 144 having an aperture 146 disposed therethrough. The conical protrusion 144 prevents water running over the tile replacement flashing 140 from entering the aperture 146. The aperture 146 can be configured to receive the post 130. In some cases, the dimensions of the aperture 146 are slightly larger than the dimensions of the post 130 to facilitate installation of the post 130 through the aperture 146 and to allow the post 130 to couple with the attachment bracket 160 (as shown in more detail below).

The conical protrusion 144 can be configured with an angle of protrusion from the plane of the tile replacement flashing 140 that is selected for one or more design objective. For example, the conical protrusion 144 can be non-orthogonal to the plane of the tile replacement flashing 140. In these cases, the conical protrusion 144 is configured with angle of protrusion from the plane of the tile replacement flashing 140 that accounts for an angle of a roof such that the post is perpendicular to the installation surface 152 when installed within the tile replacement solar panel frame mounting system 100. The tile replacement flashing 140 can also include a chamfer 148 on a corner of the top surface to facilitate easier manufacturing of the tile replacement flashing 140. In the embodiment shown, the chamfer 148 reduces the drawing required of the metal on the corner of the tile replacement flashing 140 where it interlocks with adjacent roof tile and forms down to meet the roof tile below.

Figure 4B:
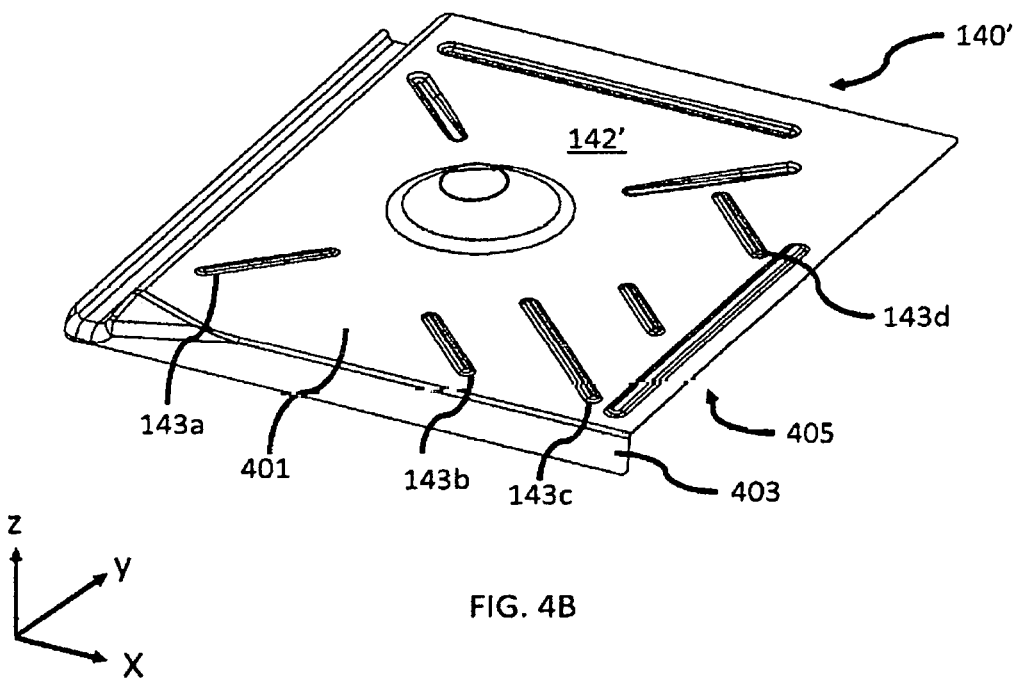
FIGS. 4B-4C illustrates a tile replacement flashing with stiffening ribs.
Figure 4C:
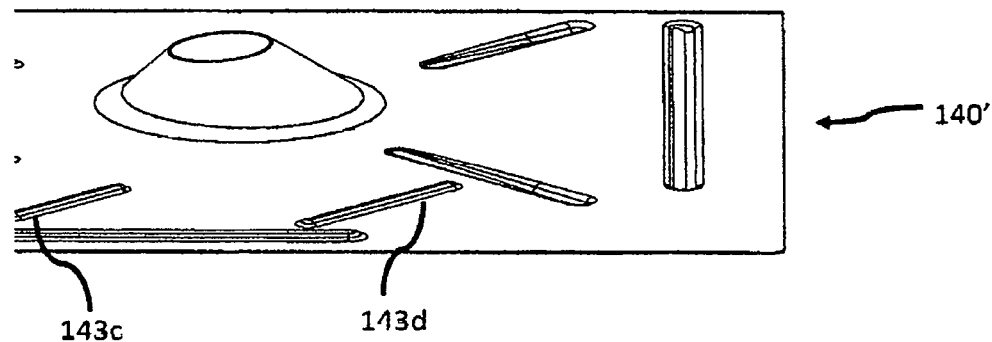

Some embodiments of the present invention involve a tile replacement flashing with upward and/or downward protruding stiffening ribs formed into its planar surface. FIG. 4B-4C illustrates a tile replacement flashing 140' with stiffening ribs 143a-143d formed into its planar surface 142'. The stiffening ribs 143a-143d serve to ensure the planar surface 142' remains substantially planar during the manufacturing process. Stiffening ribs 143a-143d can also provide structural rigidity to help maintain a flat profile of tile replacement flashing 140' during its installation on a tile roof. Stiffening ribs 143a-143d may be angled relative to the x-axis in order to allow water to flow off tile replacement flashing 140' and not pool. Stiffening ribs 143a-143d that are protruding downward towards the installation surface may also have an angled protrusion profile relative to the Z-axis allow water to drain out. Stiffening ribs 143a-143d may also have a protrusion profile with drafted sides to allow for stackability of multiple tile replacement flashings 140'. Tile replacement flashing 140' includes a top surface 401, and a side surface 403. The top surface 401 and the side surface 403 define a cavity 405 beneath the top surface.

Figure 5A:
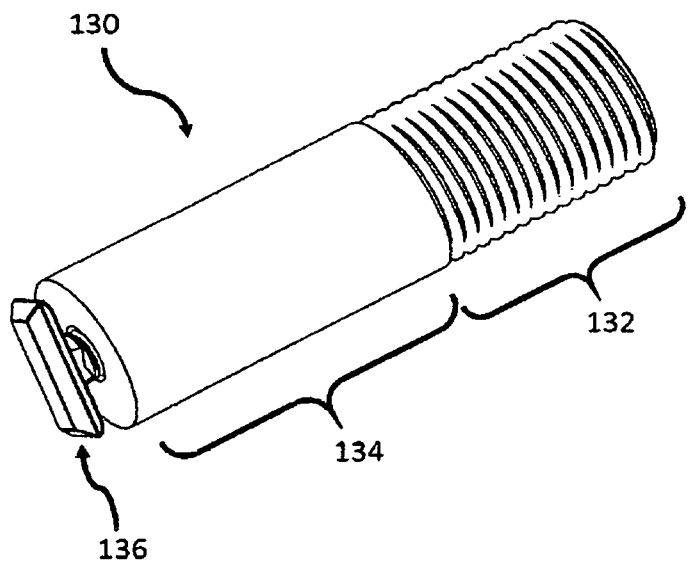
FIG. 5A illustrates the post for the tile replacement solar panel frame mounting system.

FIG. 5A illustrates the post 130 according to some embodiments of the present technology. The post 130 can be a substantially axial member with a threaded section 132 on a first terminal end, a non-threaded extender section 134, and a coupling mechanism 136 on a second terminal end. The threaded section 132 can be configured to thread into the internal threading of a support arm assembly 120 or extender arm (as explained below). The non-threaded extender section 134 can be configured to traverse the aperture 146 in the conical protrusion 144 of the tile replacement flashing 140 to allow the coupling mechanism 136 to couple with the attachment bracket 160. Also, the non-threaded extender section 134 extends away from the installation surface such that a component threaded onto the threaded section 132 can be adjusted to various heights relative to the installation surface without requiring adjustment to the post 130 or attachment bracket 160. The post 130 can also have an internal threaded section on a first terminal end to allow for attachment of other brackets. In this case, the post 130 may not have an external threaded section 132, as shown in FIG. 5C. Instead, the post 130 can have an internal threading section 138 to attach other components, such as an L-Foot.

Additionally, the post 130 can have a length to accommodate roofing tiles having a wide range of thicknesses and types (e.g. flat roofing tiles, S-type roofing tiles, ridge-type roofing tiles, Spanish-type roofing tiles, etc.). In some embodiments, post 130 may have all or a portion 139 of its body truncated to allow for a wrench to easily grip and rotate said post 130, as shown in FIG. 5D.

Also, the aperture 146 of the conical protrusion 144 of the tile replacement flashing 140 can be configured to allow the coupling mechanism 136 of the post 130 to be coupled with the attachment bracket 160 before or after the tile replacement flashing 140 is installed over the attachment bracket 160. This allows an installer to be able to install the tile replacement solar panel frame mounting system 100 without having to lift adjacent tiles when sliding in the tile replacement flashing 140.

In some cases, the attachment bracket 160 can be coupled with the post 130 and the tile replacement flashing 140 can be placed over the post 130 before fastening the attachment bracket 160 to the installation surface 152. The tile replacement flashing 140 can be removed to expose an area over the installation surface where the post can be located when the tile replacement flashing is finally installed. Next, the attachment bracket 160 can be adjusted (e.g. by selecting the appropriate attachment slots 168) to allow the post to be positioned within the appropriate area and to allow attachment slots 168 to align with a joist, stud, etc.

Figure 5B:
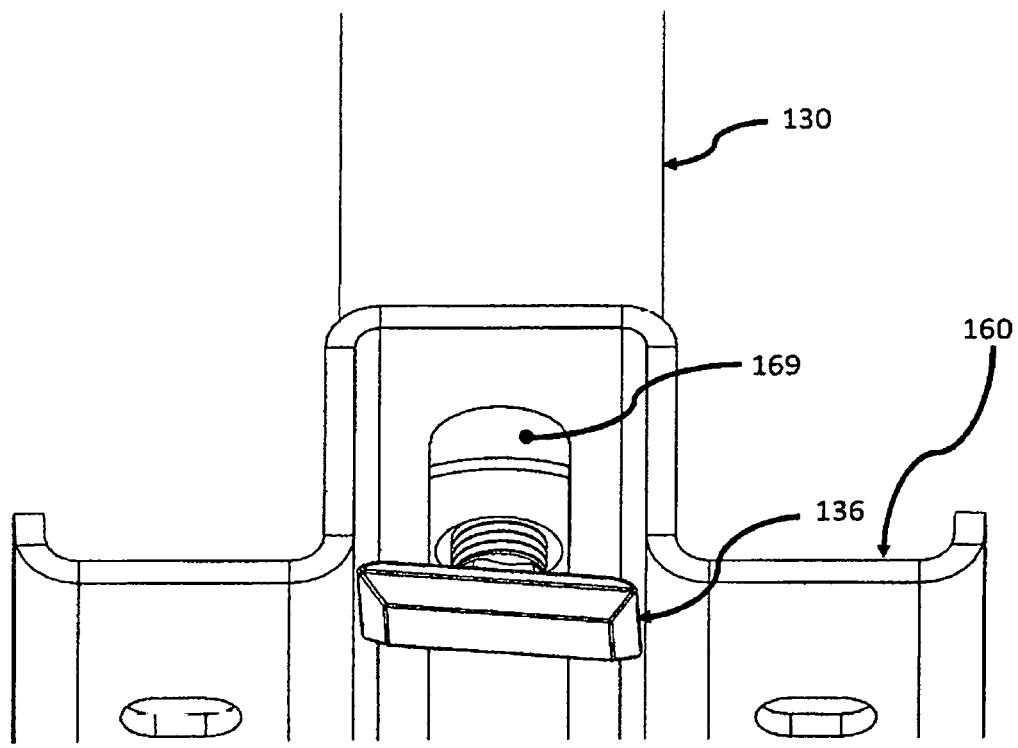
FIG. 5B illustrates the post coupled with the attachment bracket.
Figure 5C:
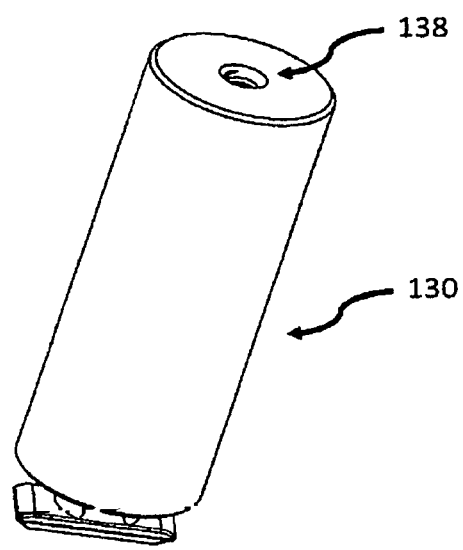
FIG. 5C illustrates a post with an internal threading section.
Figure 5D:
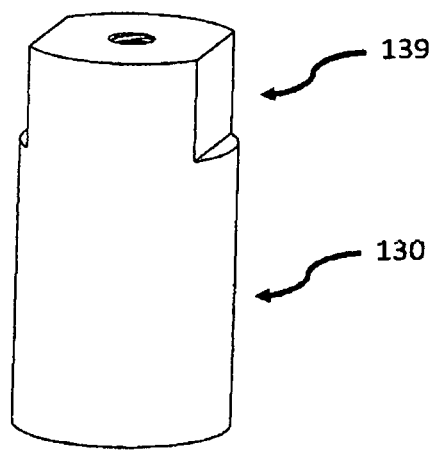
FIG. 5D illustrates a post with a portion of its body truncated.

FIG. 5B illustrates the post 130 coupled with the attachment bracket 160 according to some embodiments of the present technology. In FIG. 5B the coupling mechanism 136 is a T-bolt coupling that fits into the post slot 169 of the attachment bracket 160. The T-bolt type coupling mechanism 136 is positioned through the post slot 169 and then post 130 can be twisted to engage the T-bolt type coupling mechanism 136 with the sides of the attachment bracket 160 to secure the post 130 within the attachment bracket 160. The T-bolt type coupling mechanism interferes with the sides of the attachment bracket 160 when the post 130 is rotated, thereby engaging the threads of the T-bolt type coupling mechanism to compress the post 130 against the attachment bracket 130. In some cases, the coupling mechanism 136 is a cam type mechanism. In these cases, the cam type coupling mechanism 136 of the post 130 can be installed in the post slot 169 and turned (e.g. ninety degrees) to engage with the side walls of the attachment bracket and an internal mechanism in the post would draw the post 130 against the attachment bracket 160. In either case, the post 130 can be pre-assembled with the t-bolt type coupling mechanism 136 or cam type mechanism to allow for reduced installation time on the rooftop.

Figure 6A:
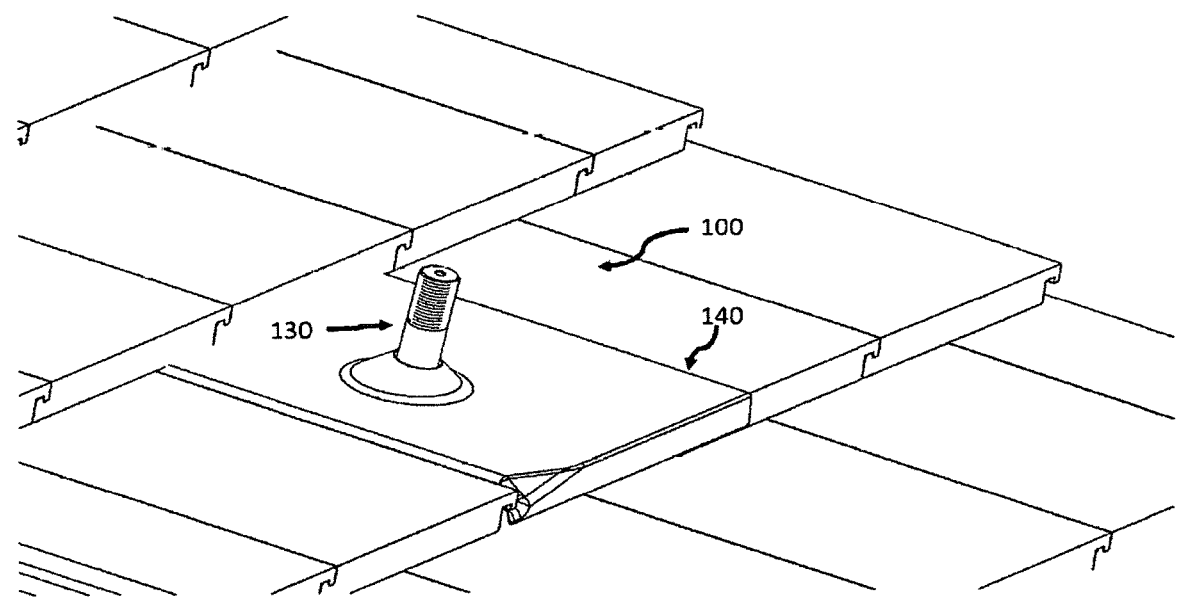
FIGS. 6A-6B illustrate a tile replacement solar panel frame mounting system with a post installed through a tile replacement flashing into an attachment bracket.
Figure 6B:
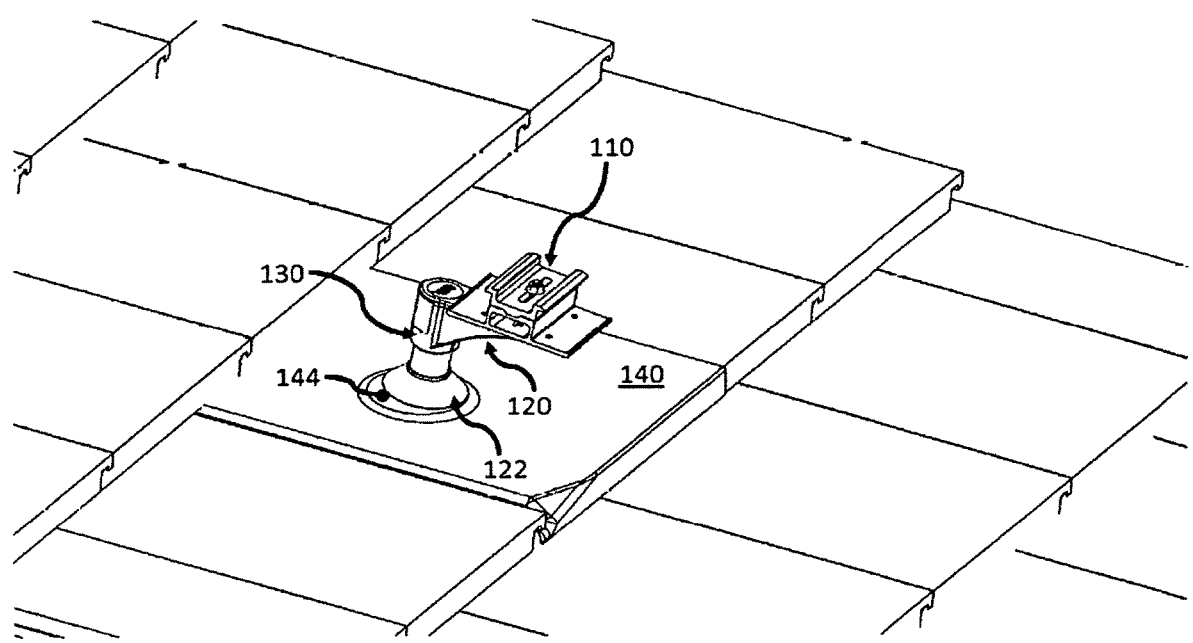

FIGS. 6A-6B illustrate a tile replacement solar panel frame mounting system 100 with a post 130 installed through a tile replacement flashing 140 into an attachment bracket (not shown). As shown in FIG. 6B, a rubber boot 122 can be installed over the post 130 and on to the conical protrusion 144 to seal the conical protrusion 144. Next, a support arm assembly 120 can be thread onto the threaded section 132 of the post 130 and the mounting clamp assembly 110 can be fastened to the support arm assembly 120. The length of the threaded section (not shown) allows the support arm assembly 120 and the mounting clamp assembly 110 to be vertically adjustable. Also, each of the support arm assembly 120 and the mounting clamp assembly 110 can include slots for allowing the mounting clamp assembly to be adjustable in a plane of the installation surface. When multiple support arm assemblies 120 and multiple mounting clamp assemblies 110 are installed in an array, the vertical and planar adjustability offers installers a wide degree of flexibility and misalignment correction caused by undulations in the installation surface and human error.

Figure 6C:
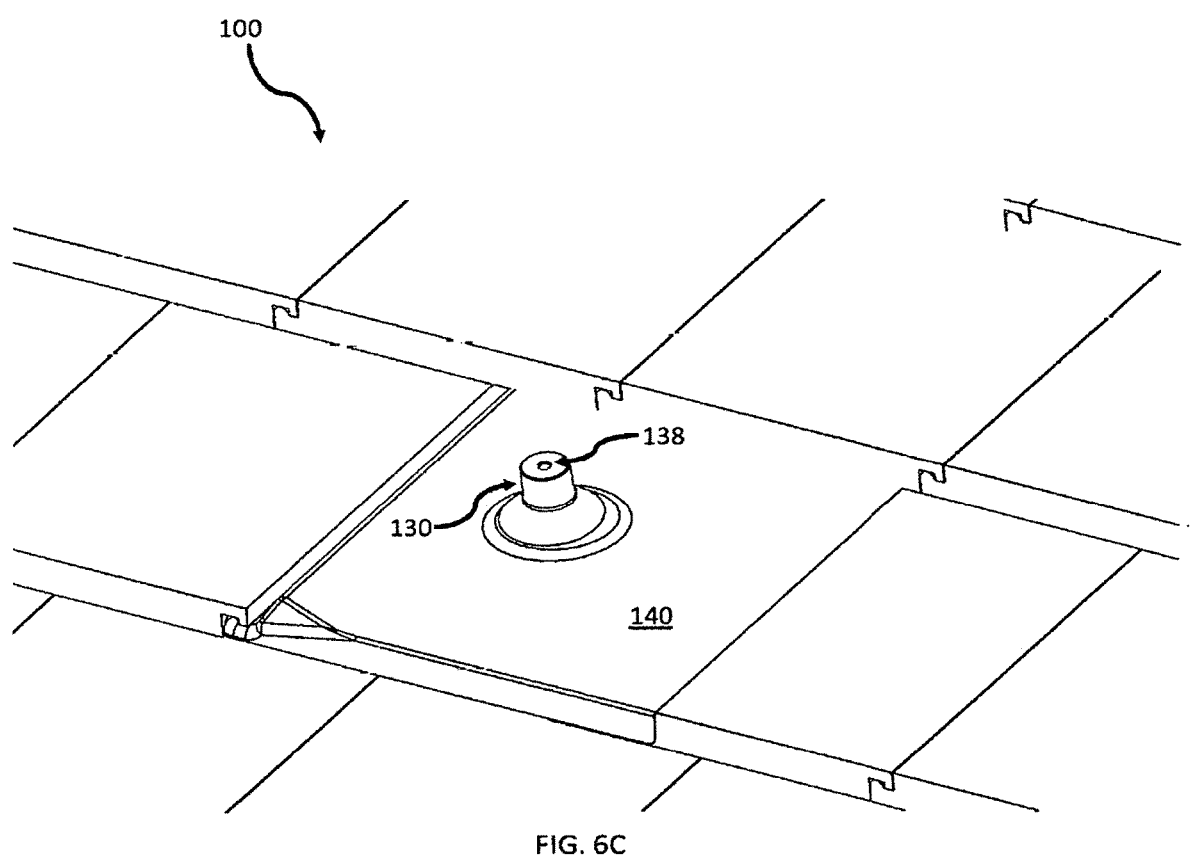
FIG. 6C illustrates a tile replacement solar panel frame mounting system with a post having an internal threading section.

FIG. 6C illustrates a tile replacement solar panel frame mounting system 100 with a post 130 having an internal threading section 138 and installed through a tile replacement flashing 140.

Figure 7A:
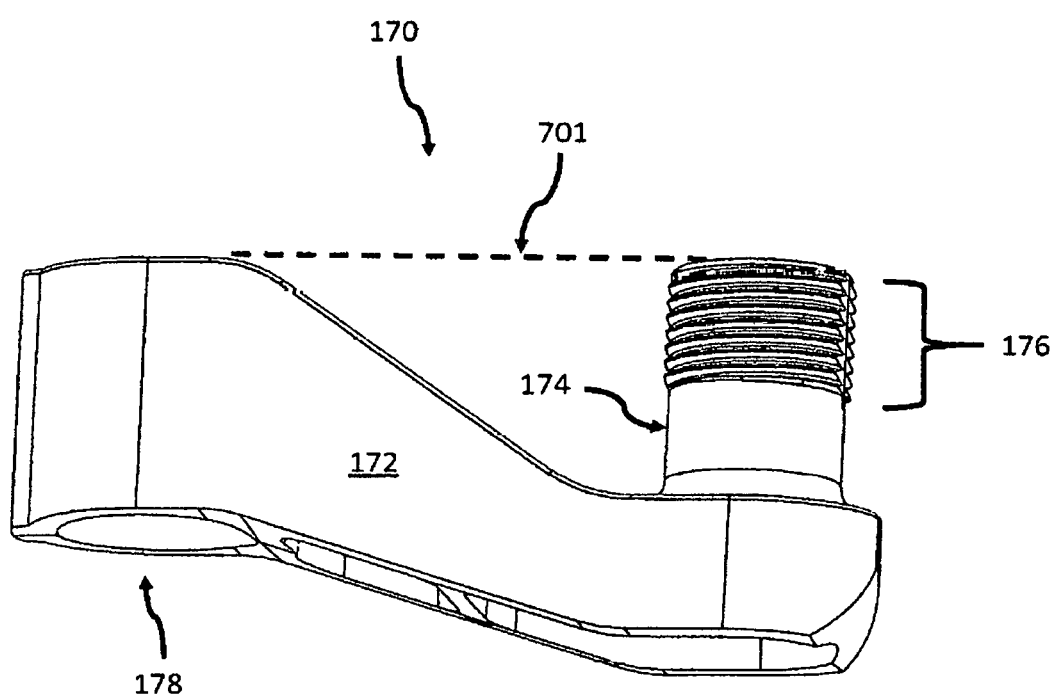
FIGS. 7A-7B illustrate an extender arm that is configured to couple with the threaded section of the post.
Figure 7B:
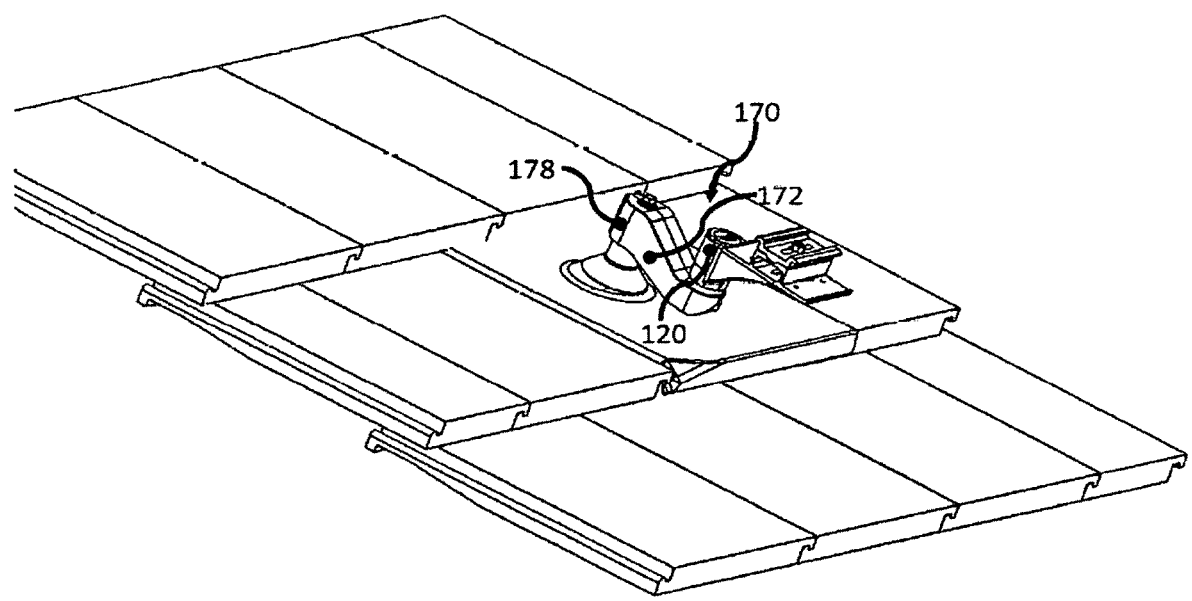

FIGS. 7A-7B illustrate an extender arm 170 that is configured to couple with the post 130 and that includes an internal section 178, a sloping extension section 172 and an extender post 174. The sloping of the sloping extension section 172 and the height of the extender post 174 can be configured to place a threaded portion 176 of the extender post 176 at substantially the same height (701) of the threaded section 132 of the post 130 relative to the installation surface. The extender post 170 allows additional adjustability when an edge of a module (e.g. a solar PV module) does not come within the range of the support arm assembly 120. In some embodiments, the post 130 can be configured with an extended S-shape to act as the post 130/extender arm 170 combination.

Figure 8:
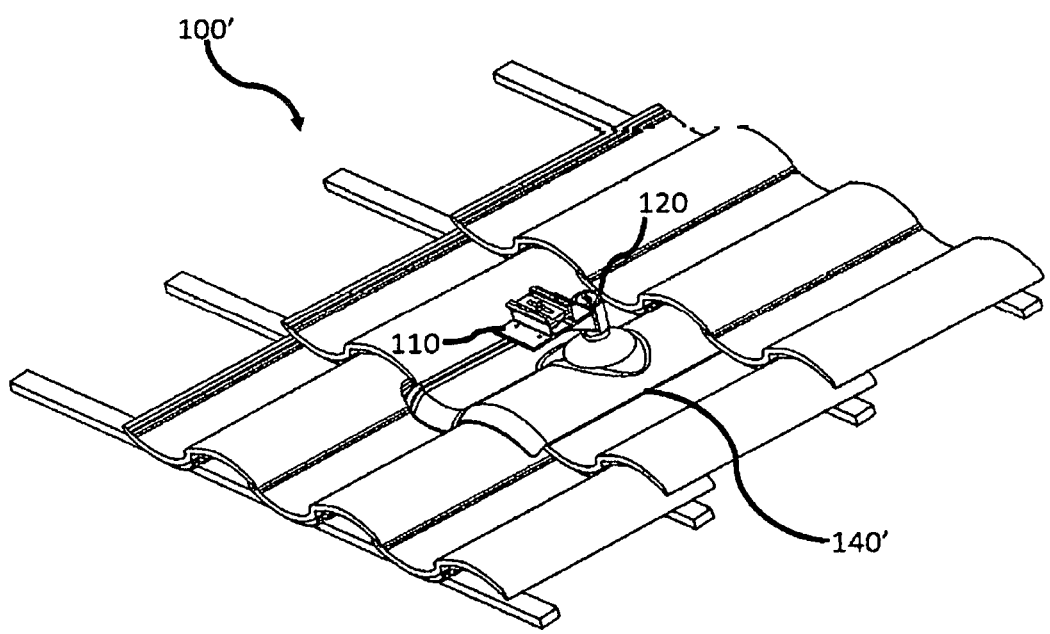
FIG. 8 illustrates an S-type tile replacement solar panel frame mounting system.

FIG. 8 illustrates a tile replacement solar panel frame mounting system 100' according to some embodiments of the present technology. The tile replacement solar panel frame mounting system 100' can include an S-type tile replacement flashing 140' and universal components: a mounting clamp assembly 110, a support arm assembly 120, a post 130, a coupling mechanism (not shown), a base flashing (not shown), an attachment bracket (not shown).

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A solar panel mounting assembly comprising:
    an attachment bracket having at least one flat section and a raised section, wherein the raised section includes a post slot;
    a post with a first internal threaded section on a first terminal end of the post and a second threaded section on a second terminal end of the post;
    a threaded T-bolt coupling mechanism, the threaded T-bolt cooperating with the first internal threaded section and configured to traverse the post slot of the attachment bracket and couple the post with the attachment bracket; and
    a tile replacement flashing having a top surface and at least one side surface defining a cavity opposite the top surface, wherein the top surface includes a conical protrusion extending away from the top surface, the conical protrusion including an aperture configured to allow the post and the threaded T-bolt to traverse therethrough.

2. The solar panel mounting assembly of claim 1, further comprising at least one attachment aperture along a length of the flat section of the attachment bracket, wherein the at least one attachment aperture comprises an extended aperture configured to receive a fastener.

3. The solar panel mounting assembly of claim 2, further comprising:
    a base flashing having a substantially flat surface, at least one through-hole, and a ridge feature, wherein the base flashing is configured to be installed on an installation surface such that the ridge feature is configured to protect the at least one through-hole from moisture flowing down an installation surface towards the at least one through-hole, and wherein the at least one through-hole is configured to align with the at least one attachment aperture when the attachment bracket is adjusted on the base flashing.

4. The solar panel mounting assembly of claim 3, wherein the ridge feature is configured in a chevron shape with a peak of the chevron shape being at a distance further away from the at least one through-hole than a distance away from an arm of the chevron shape.

5. The solar panel mounting assembly of claim 3, wherein the ridge feature is configured as a triangular ridge extending away from the substantially flat surface.

6. The solar panel mounting assembly of claim 1, wherein the post slot extends a length of the raised section of the attachment bracket.

7. The solar panel mounting assembly of claim 1, wherein the raised section of the attachment bracket is raised in only a portion of the length of the attachment bracket.

8. The solar panel mounting assembly of claim 1, wherein the post further includes an exterior non-threaded section between the first terminal end and the second terminal end.

9. The solar panel mounting assembly of claim 1, wherein the second threaded section on the second terminal end of the post is an internal threaded section.

10. The solar panel mounting assembly of claim 1, wherein the second threaded section on the second terminal end of the post is an external threaded section.

11. The solar panel mounting assembly of claim 1, wherein the tile replacement flashing includes at least one downward protruding face at a corner of the flashing formed without an aperture at the corner and stiffening ribs are formed into the top surface for rigidity.

12. The solar panel mounting assembly of claim 1, wherein a first dimension of the aperture is larger than a second dimension of the threaded T-bolt coupling mechanism and a cross-sectional dimension of the post such that the threaded T-bolt coupling mechanism and post freely fits through the aperture.

13. The solar panel mounting assembly of claim 1, further comprising a rubber boot configured to seal the aperture from moisture entering the aperture when the post is inserted therethrough.

14. The solar panel mounting assembly of claim 1, further comprising:
a support arm assembly having an internal threading and an arm, the internal threading of the support arm cooperating with the second threaded section on the second terminal end of the post; and
a mounting clamp assembly having a top clamp and a bottom clamp, wherein the top clamp is installed on the support arm assembly when a fastener is inserted through the top clamp, the bottom clamp, and tightened with a fastener nut.

15. The solar panel mounting assembly of claim 1, further comprising:
an extender arm having an internal cavity for mating with the post, an extension section, and a vertically protruding threaded post.

16. The solar panel mounting assembly of claim 15, wherein the extension section is a sloping extension section that slopes down away from the first internal threaded section, and wherein the vertically protruding threaded post is configured with a height that brings vertically protruding threaded post to a top height of the first internal threaded section.

17. The solar panel mounting assembly of claim 1, wherein the conical protrusion prevents water from entering the aperture.

18. A solar panel mounting assembly comprising:
an attachment bracket having at least one attachment aperture and a post slot along a length of the attachment bracket;
a post with an internal threaded section on a terminal end of the post;
a threaded T-bolt, the threaded T-bolt cooperating with the internal threaded section of the post and configured to traverse the post slot of the attachment bracket and couple the post with the attachment bracket; and
a tile replacement flashing having a top surface and at least one side surface defining a cavity opposite the top surface, wherein the top surface includes a conical protrusion extending away from the top surface, the conical protrusion including an aperture configured to allow the post and the threaded T-bolt to traverse therethrough.

* * * * *